May 5, 1931.  F. HUNYADY  1,804,012
SELF ADJUSTING BRAKE
Filed Feb. 25, 1928  3 Sheets-Sheet 1

Inventor
Frank Hunyady
By: E. H. Lundy
Atty.

May 5, 1931.  F. HUNYADY  1,804,012

SELF ADJUSTING BRAKE

Filed Feb. 25, 1928  3 Sheets-Sheet 3

Inventor:
Frank Hunyady.

By E. N. Lundy
Atty.

Patented May 5, 1931

1,804,012

UNITED STATES PATENT OFFICE

FRANK HUNYADY, OF CHICAGO, ILLINOIS

SELF ADJUSTING BRAKE

Application filed February 25, 1928. Serial No. 256,892.

My present invention relates to brakes for vehicles and has more particular reference to a compensating or equalizing brake for use on a motor vehicle and the like. One of the objects of my invention is to provide a brake of this character that will, upon a slight depression of the foot pedal, apply the friction elements automatically in the manner desired in order to create the proper breaking action. In this connection I have provided a novel structure whereby the proper amount of friction is obtained between the braking elements regardless of the amount of power exerted on the foot pedal. In other words the foot pedal is employed to transmit the initial movement to the brake structure and thereafter the desired amount of friction is "built up" through the automatic movement of the operating parts. I have numerous other objects in mind, among which are dependability and readiness of operation, durability in construction, simplicity and sturdiness in the formation and arrangement of the parts, accessibility for the purpose of adjustment, replacement or repair, and the whole brake structure is arranged, fabricated, and assembled in a novel and economical manner, which permits its being retailed for a reasonable price.

I prefer to carry out my invention, and to accomplish the numerous objects thereof, in substantially the manner hereinafter fully described and as more particularly pointed out in the claims, reference being herein made to the accompanying drawings that form a part of this specification.

In the drawings:—

Figure 1:
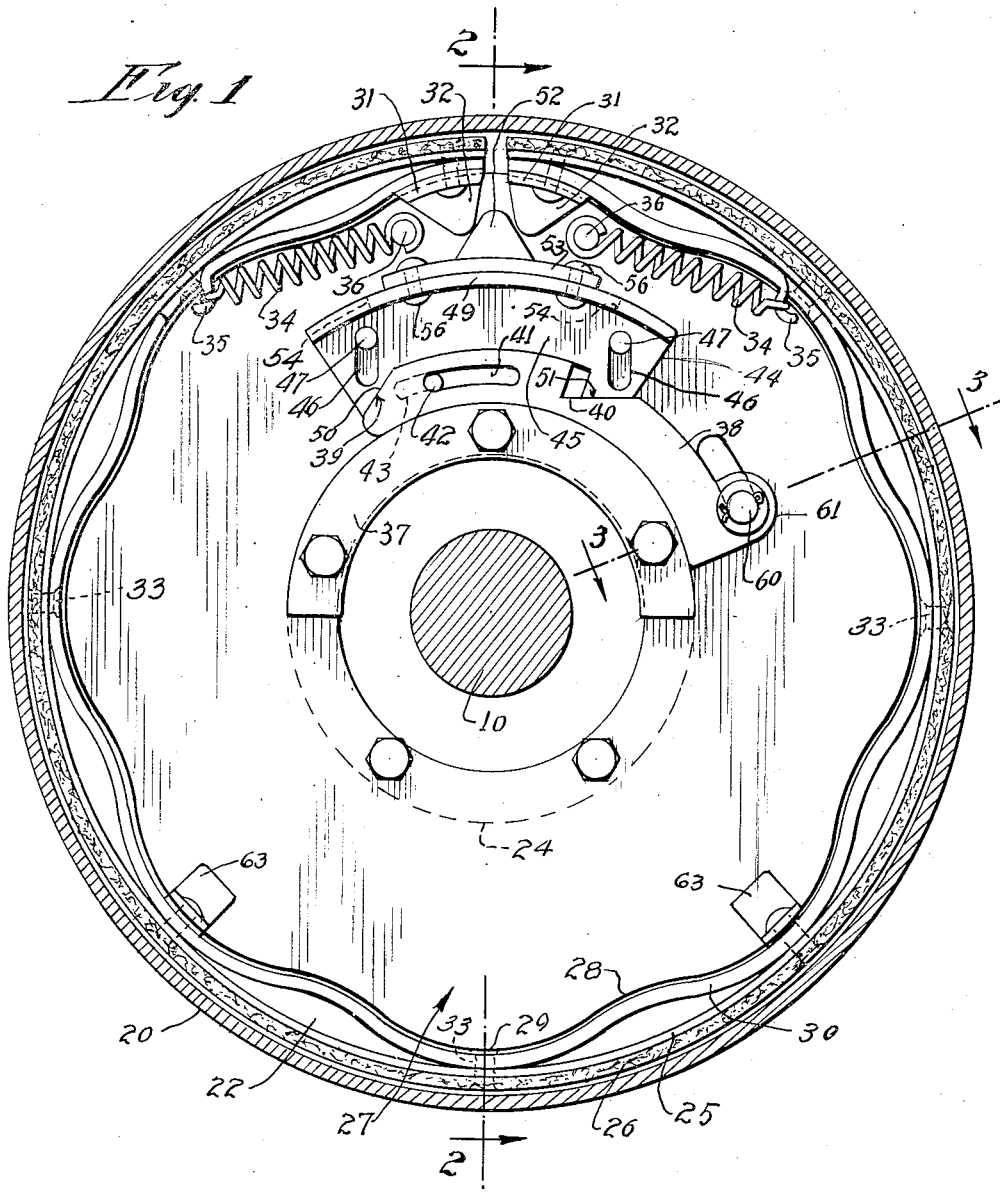
Figure 1 is a front elevation of my improved self-adjusting brake, the view being taken from the right-hand side of Figure 2 with the front wall of the brake drum and its assembled parts removed.
Figure 2:
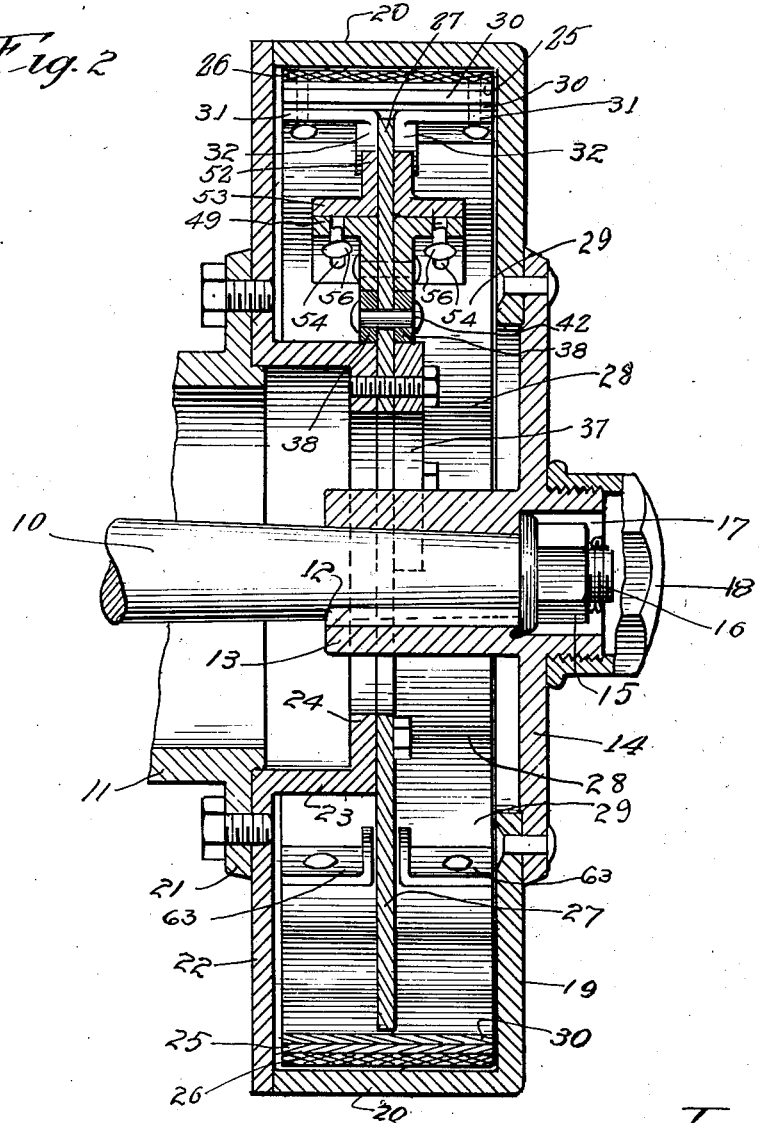
Figure 2 is a transverse section taken on line 2—2 of Figure 1 and looking in the direction indicated by the arrows.
Figure 3:
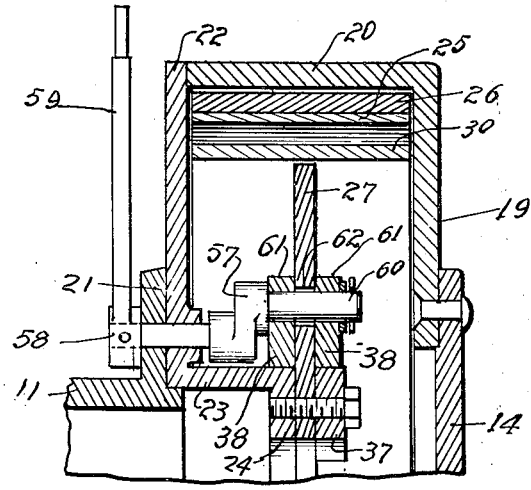
Figure 3 is a fragmentary section taken on line 3—3 of Figure 1 and looking in the direction indicated by the arrows.

It will be understood the accompanying drawings are more or less schematic and are for the purpose of disclosing a typical or preferred embodiment of my invention and for convenience the brake is shown as installed upon a rear wheel or axle of the vehicle. In these drawings I have employed similar reference characters to designate like parts where they appear throughout the several views.

The rotatable rear axle 10 has bearings in the axle-housing 11 and protrudes beyond the end of the latter, its extended end being secured by a key 12 to an inwardly projecting stub 13 of a circular mounting plate 14 that is further secured against accidental displacement by a nut 15 screwed upon the reduced and threaded end 16 of the axle. Said nut is positioned in a recess 17 formed in an extension of stub 13 and is protected by a screw cap 18. The plate 14 has the side walls 19 of the brake drum secured thereto and the lateral wall 20 of the drum extends inwardly towards the transverse plane of the end of the axle-housing 11. An annular flange 21 extends around the end of the axle-housing and has an annular closure plate 22 secured to one face by any suitable means. This closure plate is provided with an annular lateral flange 23 that extends inwardly from adjacent the end of the axle-housing and its inner end 24 turns and extends toward the axle of the housing and in a plane substantially parallel with the plane of the closure plate 22. The flange and its lateral end provide means or a support, upon which the parts of my structure are mounted.

The brake band is of the internal type that is expanded into contact with the inner face of the lateral brake drum wall 20 and consists of the circular spring band 25 upon the outer face of which is secured the fabric brake lining band 26. A ring-like plate 27 is bolted or otherwise secured on the inner lateral end 24 of the closure plate flange and the perimeter of this plate is formed with undulations so that valleys 28 are disposed between the crests 29 of the undulations, the purposes of which will hereinafter more fully appear. A secondary spring band 30 is interposed between the brake-band and the plate 27 and it is undulated or waved in a manner corresponding with and normally parallel to the undulated perimeter of said plate. The ends of this undulated secondary band, like the brake band, preferably do not meet although they may be disposed closely contiguous each other and each end of the secondary band is provided with actuating lug elements that are each in the form of an arcuate plate 31 having a lateral lug 32 that projects inwardly toward the axis of the brake structure in the manner shown. The lugs 32, which are four in number, are so disposed that a pair of said lugs will be upon each side of the plate 27 at each end of the band. Thus one lug 32 on the one side of the plate is in opposition to the alining lug on the same side of the plate but at the other end of the band 30. The adjacent or facing edges of the lugs are made oblique or wedge-shape and said edges converge towards each other in an outward direction as shown in detail in Figure 1, so that when a wedge member is inserted between these edges the lugs will be farther apart in order to expand the undulated secondary band and thus force the brake band into frictional engagement with the brake drum wall 20 at all points throughout its entire length thereby securing one hundred per cent contact. This is due to the fact that the undulated secondary band 30, the brake-band 25 and the brake lining 26 are all secured together by means of rivets 33. During the application of the brake in this manner the friction between the brake-band and drum will cause a rotative movement of the band in the direction of revolution of the wheel so that the undulations of the secondary band will engage with the undulated perimeter of the disk or plate 27, and the farther the band is moved in this direction the tighter the undulations of the secondary band will engage with the perimeter of the plate 27 which will tend to flatten the secondary band and create greater friction between the drum and brake-band. This braking position of the parts is detailed in Figure 4. Coiled contraction springs 34 are employed to return the parts to normal positions after the braking action has been completed, one end of each spring connected to a stamped out hook 35 on the secondary band 30 and its opposite end is connected to a pin 36 projecting laterally from the plate 27 adjacent the edge of the latter.

The means for operating the bands is duplicated upon opposite sides of the plate 27 and for convenience the set of elements shown in Figure 1 will be described, which will avoid confusion in terminology. For the purpose of providing an opposite shoulder on the plate 27 corresponding to the flange 23, I secure to the outer face of said plate a segmental shaped bar 37 that is secured by bolts or screws that pass through the bar and plate as well as the lateral portion 24 of the flange, and resting upon and guided by this bar is one of the wedging shoes 38. This shoe is segmental shape as seen in Figure 1 and one end is formed with an oblique face 39 while intermediate its ends there is a notch or recess of triangular shape so that a second oblique face 40 is provided. Approximately midway between these oblique faces the shoe has a segmental elongated slot 41 that is parallel with the segmental edges of the shoe and is engaged by a double-headed guide-pin or loose rivet 42 that also engages a segmental slot 43 in the adjacent portion of the plate 27 as well as the slot in the corresponding shoe on the opposite side of said plate.

The shoe 38 is moved by suitable devices in a curved or circumferential path upon the operation of the foot-pedal in order to actuate a radially movable companion shoe 44 that consists of a flat plate 45 having parallel slots 46 to coact with the double-headed guide-pins or rivets 47 that project from adjacent portions of the plate 27. The outer portion of the shoe 44 has a lateral flange 49 that affords a support for a lug engaging wedge member, and the lower edge of this shoe is provided with two oblique faces 50 and 51 that respectively engage and coact with the oblique faces 39 and 40 of the first described shoe 38, so that when the shoe 38 is moved circumferentially toward the left (Fig. 1) the shoe 44 will be moved radially in a path towards the brake-band lugs 32.

Figure 4:
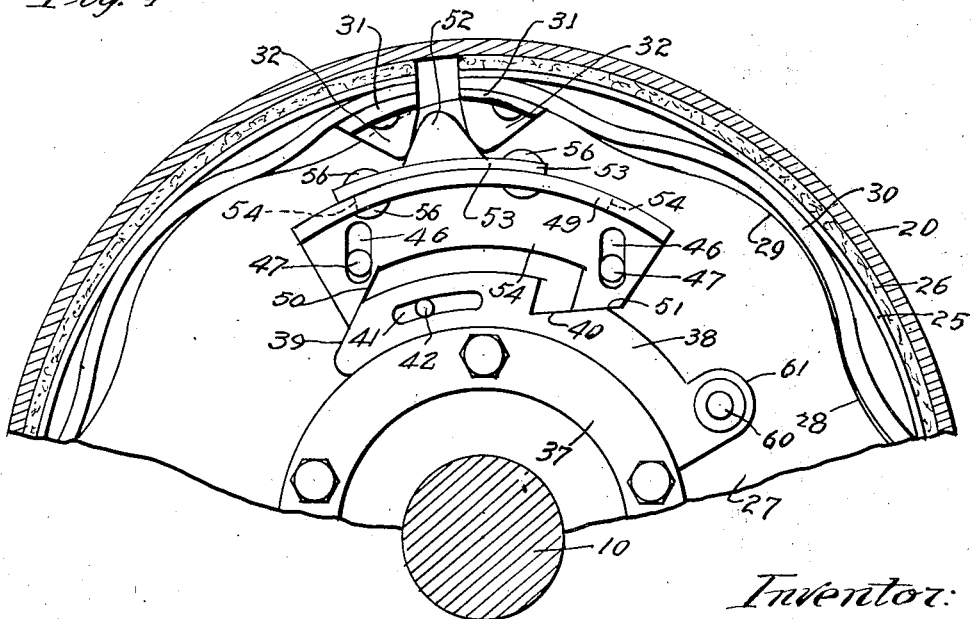
Figure 4 is a view of the structure shown in the upper portion of Figure 1, the relative positions of the parts being changed to the respective positions they assume when the brake is applied.

The shoulder or flange 49 of the radially-movable shoe 44 supports a tapered lug-engaging wedge 52 that has outwardly converging edges so that it enters the space between the oblique edges of the brake-band lugs 32 so that when the wedge is moved radially the lugs will be forced farther apart (as shown in Fig. 4) to cause a frictional coaction between the band and drum as hereinbefore described. Because of the fact that the wedge remains in engagement with the lugs during the braking action and the bands are moved circumferentially at such time, the wedge 52 is made a part of a segmental plate or shoe 53 that is slidably mounted on the flange 49 of the radially movable shoe 44. A slot 54 is made longitudinally in flange 49, and double-headed guide pins or rivets 56 are positioned in these slots to maintain assembly and permit the sliding action of the wedge 52 and its shoe.

The means for operating the set of shoes consists of a crank 57 one of the spindles 58 of which is journaled in bearings in the closure plate 22 and the flange 21 of the axle-housing and has an operating arm or lever 59 pinned to its outer end that is suitably connected to the foot-pedal. The other spindle 60 of the crank passes through apertured bosses 61 on the adjacent ends of the shoes 38 and intermediate these bosses said spindle operates in a segmental slot 62 in the adjacent portion of the plate 27.

In order to assist in maintaining the assembly of the undulated member and brake-band with respect to the stationary plate 27, suitable guide brackets 63 are mounted on the bands upon opposite sides of the plate and have upstanding portions as shown in the drawing. From the foregoing it will be seen the brake of the compensating or equalizing type with respect to its operating parts and at no time is it necessary to take the structure apart to adjust the elements and the only replacement necessary is to renew the brake-band lining from time to time as is the case with practically all brakes.

It is obvious that modifications may be made and the specific structure herein shown may be altered as desired. The foregoing detailed description and drawings have been given for the purpose of clearness of understanding only, and no unnecessary limitations should be understood therefrom, but the appended claims should be construed as broadly as permissible in view of the prior art.

What I claim is:—

1. A brake comprising a brake-drum, a brake-band internally engaged therewith, an undulated continuous member co-acting throughout its length with said brake-band, and means including rotatably and radially movable elements for operating said member to cause the band to frictionally engage the drum.

2. A brake comprising a brake-drum, an expanding brake-band internally engaged therewith, an undulated continuous member coacting throughout its length with said brake-band, and means including rotatably and radially movable elements for expanding said member to cause the band to frictionally engage the drum.

3. A brake comprising a rotatable drum, a non-rotatable band arranged to co-act therewith, a disk having a continuously undulated periphery, a continuous annular member secured to the band interposed between said disk and band, and radially and circumferentially movable wedge elements mounted on said disk and co-acting with said member, said elements being operable in their respective directions to cause said annular member to engage and move the band into frictional engagement with the drum.

4. A brake comprising a rotatable drum, a non-rotatable band arranged to co-act therewith, a disk having an undulated periphery, a continuous annular member secured to the band between said disk and band and undulated corresponding with said disk, and radially and circumferentially movable wedge elements on said disk that coact with said member and are operated to laterally move the undulated annular member whereby the band is brought into frictional engagement with said drum.

5. A brake comprising a brake-drum, a brake-band internally engaged therewith, an undulated member secured to said band and adapted to be expanded to cause the band to frictionally engage the drum, and means including rotatable and radially movable elements for expanding said undulated member.

6. A brake comprising a rotatable drum, a non-rotatable band arranged to co-act therewith, a disk having an undulated perimeter, an annular member secured to said band and coacting with the perimeter of said disk, a circumferentially movable wedge element mounted on said disk, and a radially movable wedge element actuated by the first wedge element to cause the undulated member to engage said disk and move the band into frictional engagement with the drum.

7. A brake comprising a rotatable drum, a non-rotatable band arranged to coact therewith, a disk having a continuous undulated perimeter, an annular member secured throughout its length to said band and having undulations corresponding with the perimeter of said disk, and separately movable wedge elements mounted on said disk and operated in different directions to cause the annular member to circumferentially move to engage the perimeter of the disk whereby the band is brought into frictional engagement with said drum.

8. A brake comprising a brake-drum, a brake-band internally engaged therewith, an annular undulated member secured to said band, a support, a radially movable wedge adapted to expand said undulated member to cause frictional coaction between the drum and band, and means mounted on the support for radially moving said wedge and upon which said wedge has sliding engagement.

9. A brake comprising a brake-drum, a brake band internally engaged therewith, an annular undulated member secured to said band, a support, a radially movable wedge adapted to expand said undulated member to cause frictional engagement between the drum and band, coactively related members mounted on said support one of which is radially movable and the other of which is circumferentially movable, and means for actuating the circumferentially movable member to operate the brake.

10. A brake comprising a drum, a band internally engageable therewith, an annular undulated member secured to said band, a support, coactively related members mounted on said support and having oblique engaging faces, a wedge movable radially with one of said members and having sliding movement in another direction, said wedge adapted to expand said undulated member to cause frictional engagement between the drum and band, and means for actuating one of said coactively related members to operate the brake.

11. A brake comprising a brake-drum, a brake band internally engageable therewith, oblique faced lugs at the ends of said band, a radially movable wedge adapted to expand said band by engagement with said lugs, and a pair of shoes for operating said wedge, one of said shoes having radial movement and the other shoe having circumferential movement and said shoes having coacting oblique surfaces.

12. A brake comprising a brake-drum, a brake-band internally engageable therewith, oblique faced lugs at the ends of said band, a radially movable wedge adapted to expand said band by engagement with said lugs, a radially movable shoe on which said wedge is mounted, a circumferentially movable shoe for actuating the first-mentioned shoe, said shoes provided with oblique engaging surfaces, and means for operating the circumferentially movable shoe.

13. A brake comprising a rotatable brake-drum, an internal brake band coacting therewith, and having an irregular formation upon the face opposite that engaged with the drum, a stationary annular member having an irregular formation adjacent the irregular face of the band, means including elements movable at an angle to each other adapted to expand said band into frictional engagement with the drum, whereby said band is caused to move circumferentially to engage the irregular formation thereon with the formations on the annular member which causes a further coaction between the band and drum.

14. A brake comprising a rotatable brake-drum, an internal brake-band coacting therewith and having an irregular formation upon the face opposite that engaged with the drum, a stationary member having an irregular formation adjacent the irregular face of the band and radially and circumferentially movable shoes mounted on said annular member and adapted to expand said band into frictional engagement with the drum, whereby said band is caused to move circumferentially to engage the irregular formation thereon with the formations on the annular member which causes a further coaction between the band and drum.

15. A brake comprising a brake-drum, a brake-band adapted to frictionally engage therewith, an undulated annular member secured to said brake-band, a disk-like element having an undulated periphery to coact with said annular member, and means operatively connecting said member and element and including rotatably and radially movable elements, whereby the operation of said means causes the band to engage the drum.

16. A brake comprising a brake-drum, a brake-band internally engaged therewith, an annular undulated member secured to said band, a support, a radially movable wedge adapted to expand said undulated member to cause frictional engagement between the drum and band, said wedge being mounted to permit of slight circumferential movement with the band and member during braking action, coacting members mounted on said support and having relative movement one radially and the other circumferentially, and means for actuating the circumferentially movable member whereby to operate the brake.

17. A brake comprising a brake-drum, a brake-band adapted to internally engage therewith, an undulated annular member secured to said band, a bracket element extending into said drum, a disk-like element secured to and carried by said bracket and having an undulated periphery to coact with said undulated annular member, and means operatively connecting said undulated member and disk-like element and including rotatably and radially movable elements whereby the operation of said means causes the band to frictionally engage the drum.

18. A brake comprising a brake-drum, a brake-band adapted to frictionally engage therewith, an undulated annular strap secured to said brake-band, a disk having an undulated periphery to coact with said strap, retainers mounted on said strap and having guiding contact with said disk, and means operatively connecting said strap and disk and including rotatably and radially movable elements, whereby the operation of said means causes the band to engage the drum.

19. A brake mechanism for wheels of motor vehicles comprising a brake-drum, a cover-member for the open side thereof, supporting means extending from said cover-member into said drum, a plate secured to said means, and friction creating devices mounted on said plate and including elements adapted to coact with said drum.

20. A brake mechanism for wheels of motor vehicles comprising a rotatable brake-drum, an axle-member upon which the wheel is mounted, a cover for the open side of said drum and extending around said axle-member, annular supporting means extending from said cover into said drum around the axle-member, a plate secured to said supporting means within the drum and having an opening through which the axle-member extends, and friction creating devices connected to said plate and including elements adapted to coact with said drum.

Signed at Chicago, in the county of Cook, and State of Illinois, this 23rd day of February, 1928.

FRANK HUNYADY.